United States Patent [19]

Miller et al.

[11] 3,723,407

[45] Mar. 27, 1973

[54] METHOD OF PREPARING VEGETABLE PROTEIN CONCENTRATES

[75] Inventors: David M. Miller, Forest Park; Morris D. Wilding, Downers Grove, both of Ill.

[73] Assignee: Swift & Company, Chicago, Ill.

[22] Filed: Apr. 13, 1972

[21] Appl. No.: 243,868

Related U.S. Application Data

[63] Continuation of Ser. No. 79,655, Oct. 9, 1970, abandoned.

[52] U.S. Cl. ................................260/123.5, 99/17
[51] Int. Cl. ................................................A23j 1/14
[58] Field of Search ..................260/123.5, 112 R

[56] References Cited

UNITED STATES PATENTS

| | | | |
|---|---|---|---|
| 2,928,821 | 3/1960 | Chayen | 260/112 |
| 3,090,779 | 5/1963 | Chayen | 260/112 |
| 3,261,822 | 7/1966 | Robbins et al. | 260/123.5 |
| 3,583,872 | 6/1971 | Wilding et al. | 260/123.5 X |
| 2,881,076 | 4/1959 | Sair | 99/17 X |

*Primary Examiner*—Howard E. Schain
*Attorney*—Edward T. McCabe et al.

[57] ABSTRACT

Vegetable protein concentrates of high viscosity are obtained by contacting undenatured, defatted, vegetable protein source material with an aqueous system, acidifying said system and subjecting the material to centrifugal speeds and differential pressure effects while passing it through a shearing orifice so as to disrupt the natural cell structure of the protein bodies. Subjecting the protein material, in a concentrate process, to a momentary pressure build-up and sudden release of the cellular tissue of the protein bodies gives a released protein that has markedly different viscosity properties than are possessed by protein concentrates prepared in accordance with prior art procedures.

10 Claims, No Drawings

METHOD OF PREPARING VEGETABLE PROTEIN CONCENTRATES

This application is a continuation of applicants' copending application Ser. No. 79,655, filed Oct. 9, 1970, now abandoned.

This invention relates to a method of modifying the physical characteristics of protein concentrates. The protein concentrates of this invention possess excellent water binding properties in high fat content systems.

As the world population increases, the need for protein is becoming more important as a basic nutritional requirement. The requirements for both protein quantity and quality are well known in the animal and human diet field. In this connection, the physical form or structure of the protein in the food is much more important than some have considered it to be as a prerequisite for gaining full acceptance of additional proteins in foods.

Generally speaking, it is more difficult to isolate or separate protein from cellular material than it is to separate animal or microbial produced protein. Vegetable proteins tend to agglomerate into extremely large molecules, thus impairing their separation as individual or separate identities. During conventional extraction procedures, chemical entities such as proteins are released from their natural state all of which tend to stabilize their chemical and physical structures. It is believed that different ways of releasing protein from their cellular habitat will create different physical and chemical properties in the separated proteins.

In general, however, vegetable protein can be extracted from a vegetable protein source material, usually an oil-seed material, by treatment with water. For example, defatted soybean meal or flakes can be agitated with about ten parts water to one part meal for 20 to 30 minutes and then centrifuged. The supernatant will contain about 35 percent to about 65 percent of the available protein from the original sample.

One process to increase the extractable protein yield was developed by Wilding and Peng, U. S. application Ser. No. 723,257 which process calls for forming a slurry of water and vegetable protein source material such as soybean meal or flakes and passing this slurry through an Urschel mill equipped with a microcut head whereby high intensity shearing forces disrupt the natural cell structure of the protein bodies. The result is that it is possible to extract from 70 to 80 percent of the available protein from the raw source material while using mild conditions. In that process, tap or distilled water of neutral pH is used and the process is directed solely to the concept of increasing the yield of extractable protein.

However, protein source material contains flavoring matter (bitter), gum, pigmentary matter, etc. all of a nonproteinaceous structure, i.e. carbohydrates, etc. It is these nonproteinaceous materials that supply the undesirable odors, tastes, and color to the extractable protein and, in effect, render it unacceptable as a food substance.

In addition to the neutral process of extracting water soluble proteins, there are basically two procedures for obtaining and purifying extractable protein so as to render it acceptable either as a food per se or as an additive to food products. A protein fraction, resulting from these two processes, differs in chain length of the various protein molecules and varies also in regard to properties, etc. These protein fractions are called isolates or concentrates depending upon the process used to produce them and their degree of purification.

In an isolate process, the soybean meal is put into an alkaline solution to solubilize a particular protein fraction. Some carbohydrates, gums, sugars, etc. are precipitated and after centrifuging are thrown away. The soluble protein is then neutralized. Representative of a process for forming isolates is the Chayen process, U.S. Pat. No. 3,090,779 which teaches subjecting raw vegetable materials to severe mechanical treatment of a specific type, i.e. hammermilling, alkalizing, centrifuging and subsequent acidulating.

The Robbins U.S. Pat. No. 3,261,822 is also directed to a process for preparing soy protein isolate but is modified to the extent that a heat irreversible gelatin type gel is desired. The Robbins process is a little different in that the patentee first acidulates and discards the undesirable soluble fraction. The solids are then resolubilized by a pH adjustment and an extra separation step is used to get the isolates.

In most prior art isolate procedures, relatively harsh alkaline solutions are used to extract the desired proteinaceous material. Such procedures possess several disadvantages. For example, extensive hydrolysis takes place coupled with the fact that the isolated proteinaceous material, upon precipitation, is slow in settling and is difficult to handle in succeeding stages of the process.

For these reasons, other prior art processes advocate a somewhat different treatment of the vegetable protein material. U. S. Pat. No. 2,881,076 issued to Sair is directed to a process of preparing concentrates (actually physically different protein fractions when compared with the isolates) and teaches a representative method for forming concentrates. Generally, in a concentrate process, an aqueous slurry of soybean material is acidified to a pH of about 4 to 5.5 to precipitate a certain protein fraction. Note, however, that the slurry must be agitated for 1 to 1-½ hours as no milling step is included. Sugars and undesirable constituents remain soluble and are decanted and thrown away. Precipitate containing a large amount of protein is then resolubilized by adjusting the pH back to neutral. Generally, emulsifying and water binding properties of the protein can be enhanced by a heating treatment as taught in the Sair Patent. The product is then spray dried.

However, most protein fractions prepared by the concentrate method have poor viscosity properties as well as water binding properties. They are not very effective in high fat content systems. In this connection there are a few soy protein powders on the market sold to be used as emulsifying agents, etc. Generally speaking, these soy powders can be used in various systems but are not so called "universal" emulsifiers. That is, they will function in some systems but are unacceptable for use in other systems. For example, they do not work well in systems of high fat content, i.e. 30 to 35 percent or more fat and are usually weak in water binding properties.

It is therefore one object of this invention to provide a process for recovering vegetable proteins having universal emulsifier properties.

Another object of this invention is to provide a procedure to recover substantially unhydrolyzed vegetable protein concentrate in good yield yet having superior physical properties.

Additional objects, if not specifically set forth herein, will be readily apparent to those skilled in the art from the detailed description of the invention which follows.

In general, this invention relates to a process for recovering bland, substantially unhydrolyzed, vegetable, protein concentrates. The procedure comprises contacting defatted vegetable protein source material with an aqueous solvent under approximately mild acidic conditions, i.e., pH range of about 3 to about 6, usually 3.5 to 5.5 and quite often between 4 and 5, said aqueous solvent having a temperature not substantially in excess of 100° F., but preferably between 40° F. and 90° F. and passing the resultant slurry through a narrow opening whereby high intensity rupturing forces disrupt the natural cell structure thereby freeing the desirable proteinaceous material. The entire product exiting through the narrow opening is centrifuged to separate soluble material from insoluble protein solids. The solids may be washed with tap water and recentrifuged. The re-suspended solids are normally heated to about 40° C. and 80° C and the pH adjusted to about 6.5 to about 8.0 with an alkaline food grade substance. The adjusted mixture can then be heated and spray dried. The nutritious protein concentrate may be used per se as a food substance or may be incorporated into other food material.

More specifically, while the process is typically applied to the recovery of soya protein, it is mentioned at this time that other defatted vegetable materials, especially oil-seed materials, may be treated in accordance with the procedure of this invention so as to recover the respective proteins therein. Typical raw material which may be utilized, following conventional oil extraction procedures, comprises soybeans, peanuts, castor beans, cottonseeds, sesame seeds, and sunflower seeds. While the process is applicable to a wide range of vegetable materials, for the sake of brevity, the invention will be described only in reference to defatted soybean meal. In this connection, the term "vegetable protein source material" used throughout the specification and claims is to be construed to cover any material derived from plants which contain reasonable amounts of protein and specifically includes defatted soybeans, soybean grits, meal, flour, flakes or other subdivided particles of the soybean.

In carrying out the process, sufficient water is provided to hydrate the protein cells to the maximum and to provide a slurry type mixture. If insufficient water is present, the material will tend to form a paste and the over-all efficiency of the extraction process will be greatly diminished. On a weight basis, the water should be present in a ratio of between about 3 to about 27 parts, preferably between about 8 to 10 parts for 1 part of soybean protein source material. When using a water to soybean material ratio of about 9:1 it is possible to recover 75 percent of the available protein.

The pH of the aqueous mixture of defatted soy flakes is usually adjusted to about 3.5 to 5.5 with a food grade acid and then passed through a shearing orifice usually of the Urschel microcut type having openings of about 0.001 inches to about 0.012 inches. It is pointed out at this time that the pH adjustment can occur after the comminutor process but the viscosity changes are different as shown in the Examples below. Accordingly, when preparing the high viscosity concentrates, acidulation should take place prior to subjecting the protein cell bodies to a momentary pressure build-up and sudden release on the cellular tissues of the protein bodies.

After the vegetable protein source material has been hydrated and acidulated to a pH of 3.5–5.5, it is subjected to a critical type of severe mechanical working so as to rupture the cell wall and membrane of the protein bodies so as to increase the speed and yield of extraction of the protein bodies as well as altering the physical characteristics of the protein fractions. This severe mechanical working is accomplished by passing a slurry of the soybean protein source material under an acidic pH at high centrifugal speeds through a narrow opening of about 0.0005 inches to about 0.012 inches, preferably 0.003–0.008. In order to rupture the protein cell, high intensity forces are required to cause both shearing the differential hydrolynamic pressure effects on the said cellular protein structures. The processed proteinaceous material can then be centrifuged, washed, and recentrifuged to remove the soluble carbohydrate portion. The suspended solids can be dried or neutralized, heated, liquefied and then spray dried. Subjecting the protein to the pH adjustment results in unusual viscosities when compared with other concentrate processes. It is believed that the protein is released in a more native form to allow significantly more reactivity of the protein molecule.

The temperature of the aqueous solvent used to hydrate the soybean material may vary; however, it has been found that temperatures in the range of 40° F to 140° F. are adequate. It should be noted, however, that the temperature need not exceed 100° F. and indeed temperatures in the range of 40°F to 90°F. are preferred. However, the instant invention does not exclude the use of heated or chilled water but it is preferred to use water that is not substantially in excess of 100° F.

When subjecting the slurry to high centrifugal speeds while passing it through a narrow shearing orifice whereby the high intensity shearing forces disrupt the natural cell structure of the protein bodies, it has been found that a tangential speed of the shearing blade should exceed about 2500 in./sec. and that the discharge orifice should range between 0.0005 inches and 0.012 inches. A typical shearing type comminutor for this purpose is an Urschel Comitrol (MG Model) with a Microcut-Head attachment. The Micro-cut is a ring of closely spaced tungsten carbide blades. When the defatted oil-seed slurry is revolved inside the ring of blades at very high speed, centrifugal forces cause pressure against the blades equal to several thousand times the weight of the product. The leading edge of each blade is a sharp knife edge, and the blades are carefully positioned so that wall surfaces between the knife edges are relieved to eliminate friction that would produce heat. When the product passes over the sharp forward edge of the blade, a small amount is shaved off and exits between the blades. With different micro-cut heads, the depth of cut will vary between about 0.0005 and 0.012 usually between about 0.001 and 0.006 inches. Using a 6 inch diameter, 9,000 rpm will give the shearing blade a tangential speed of about 2,830 in./sec. while 36,000 rpm produces a tangential speed of around 11,290 in./sec.

The following examples are presented to illustrate the invention and they should not be taken in any manner as limiting the invention which is defined in the appended claims.

To illustrate the invention it is advantageous to present examples of the instant process as contrasted to prior art. Even numbered examples are representative of the instant process.

EXAMPLE I (PRIOR ART)

300 grams defatted soy flour of 65 percent protein solubility was suspended in 3 liters of tap water and the pH adjusted from the ambient pH of 6.6 to pH 4.1 with six normal hydrochloric acid. After stirring for 30 minutes, the suspension of flour and water was centrifuged at a relative centrifugal force of 4,000 times gravity for 20 minutes. This force was sufficient to yield a transparent, slightly colored supernatant and a firmly compacted residue. The supernatant containing soluble carbohydrates, ash, nonprotein nitrogen constituents and acid soluble protein was decanted and discarded and the residue resuspended in 1.5 liters of tap water. The pH was again carefully checked to insure that it remained at pH 4.1. After stirring for 30 minutes the wash water was separated from the solids by centrifuging as above. The supernatant was again decanted and discarded. This time the washed residue was resuspended in about 2 liters of tap water, the pH adjusted to 7.5 with sodium hydroxide and the suspension—not quite a true solution—heated to 40° F. and held at that temperature for 23 minutes. Following the heating step, the suspension was dried using a Nichols type spray dryer.

EXAMPLE II (INVENTION)

1.5 pounds of a defatted, relatively undenatured soy flakes and 15 pounds of tap water were stirred for 30 minutes and then acidified to pH 4.1, the suspension was passed twice through an Urschel Laboratories microhead mill with 0.006 inch slit openings. Following this procedure which resulted in a disruption of the soy flake at the cellular level, the pH was checked, the entire suspension centrifuged, and then washed in the manner indicated in Example I using a wash volume of 7-½ pounds of tap water. After the wash step, the washed solids were resuspended in about 10 pounds of tap water, the pH adjusted to 7.5, the suspension heated to 40°C. and held there for 30 minutes. Spray drying of the suspension followed.

EXAMPLE III (PRIOR ART)

300 grams of the soy flour used in Example I was suspended at pH 5.1 in 3 liters of tap water and stirred, centrifuged, and washed as in Example I. Following the washing step and resuspension of the residue in about 2 liters of tap water, the pH was adjusted to 7.5 and the suspension heated to 80°C. for 10 minutes. The entire suspension was then spray dried.

EXAMPLE IV (INVENTION)

1.5 pounds of the soy flakes used in Example II suspended in 15 pounds of tap water and stirred for 30 minutes were adjusted to pH 5.1 and this suspension passed twice through the microhead mill. The suspension was then centrifuged, resuspended and washed in the manner of Example II and then after adding 10 pounds of tap water to the washed residue and adjusting to pH 7.5, the temperature of the suspension was brought to 80°C. and held at that temperature for 10 minutes. Spray drying followed.

EXAMPLE V (PRIOR ART)

The procedure and materials of Example I were used, but this time the pH was adjusted to 5.1 before centrifuging and following the wash and resuspension steps the pH was brought to 7.5. After this neutralization, the temperature of the suspension was raised to 40° C. for 23 minutes and the suspension dried.

EXAMPLE VI (INVENTION)

Using defatted soy flakes the procedure of Example IV was followed. However, after neutralizing to pH 7.5 the temperature was increased only to 40° C. and held there for 23 minutes.

EXAMPLE VII (PRIOR ART)

300 grams of defatted flour were suspended in 3 liters of tap water and the pH adjusted to 4.7. After stirring for 30 minutes the suspension was centrifuged, washed and resuspended as in Example I. The pH was adjusted to 7.0, the temperature was then lowered to 15°C. and held there for 15 minutes. Following this neutralization and cooling, the suspension was spray dried in the usual fashion.

EXAMPLE VIII (INVENTION)

A suspension of 1.5 pounds soy flakes and 15 pounds tap water was stirred for about 15 minutes and passed twice through the microhead mill. The pH was then adjusted to 4.7 and the suspension centrifuged, washed and resuspended as taught in Example I. The pH was adjusted then to 7.0 and the suspension treated like Example VII.

EXAMPLE IX (PRIOR ART)

After acidifying, centrifuging, washing and resuspending the quantity of soy flour in the manner of Example III, the suspension of washed solids was neutralized to pH 6.5, the temperature raised to 40°C. and held there for 23 minutes. The suspended solids were taken to a dry state, about 5 percent moisture, by spray drying.

EXAMPLE X (INVENTION)

1.5 pounds of soy flakes were stirred with 15 pounds of tap water for 15 minutes and then passed twice through the Urschel microhead. Immediately after the cellular disruption step and with vigorous stirring the suspension was acidified to pH 5.1, centrifuged, washed and resuspended in about 10 pounds of water. Neutralization and heating were as in Example IX.

EXAMPLE XI (PRIOR ART)

The materials and procedure of Example III were followed with the exception of the temperature being held at 80°C. for 23 minutes instead of 10 minutes.

EXAMPLE XII (INVENTION)

In this experiment the acidification step did not occur until after the aqueous suspension of flakes had passed twice through the microhead mill; then the pH was lowered to 5.1. The suspension was then centrifuged, washed and treated in general as described by Example I. Following the washing step and after being resuspended in about 10 pounds of tap water the pH was increased to 7.5, the temperature raised to 80°C. and the suspension held for 23 minutes. Again, the moisture level was reduced by spray drying.

To comment further concerning the examples presented above, it should be noted that all pH adjustments took place using either 6 normal hydrochloric acid or 6 normal sodium hydroxide. Centrifuging, as indicated, was in all instances at a relative centrifugal force of 4,000 rpm for 20 minutes.

TABLE ONE

COMPARATIVE VISCOSITIES[a] OF SOY CONCENTRATES

| Example[b] | region 1 | 2 | 3 | 4 | high | low | rise |
|---|---|---|---|---|---|---|---|
| I | −20 | 10 | 60 | 80 | 220 | 70 | 150 |
| II | −100 | 200 | 20 | 100 | 980 | 650 | 330 |
| III | −10 | 0 | 80 | 90 | 270 | 100 | 170 |
| IV | 10 | 110 | 170 | 580 | 1630 | 760 | 870 |
| V | −40 | 20 | 60 | 100 | 310 | 130 | 180 |
| VI | −180 | 90 | 30 | 150 | 980 | 710 | 270 |
| VII | −240 | 60 | 80 | 90 | 400 | 160 | 240 |
| VIII | −80 | 50 | 80 | 130 | 480 | 220 | 260 |
| IX | −120 | 5 | 35 | 65 | 260 | 140 | 120 |
| X | −100 | 40 | 110 | 230 | 670 | 290 | 380 |
| XI | −10 | 0 | 35 | 95 | 210 | 80 | 130 |
| XII | 40 | 110 | 270 | 320 | 1180 | 440 | 740 |

REGION 1: The change in viscosity during the period of temperature transition from 50°C. to 71°C.
REGION 2: Change in viscosity during the 6 minutes the suspension is held at 71°C.
REGION 3: Viscosity change during the cooling cycle from 71°C. to 50°C.
REGION 4: Change in the viscosity during the final cooling phase from 50°C. to 25°C.
HIGH: The highest viscosity reached during the heating and cooling cycle.
LOW: The lowest viscosity.
RISE: The total change in viscosity from low to high.
a. Expressed in cm. gm.
b. Odd numbered samples are not Urschellized; even numbers are.

TABLE TWO

COMPARATIVE EMULSION STABILITIES FOR SOY CONCENTRATES

| Example[c] | Percentage of emulsion remaining after | |
|---|---|---|
|  | Heating | Centrifuging |
| I | 90.6 | 13.3 |
| II | 100.0 | 44.2 |
| III | 96.0 | 84.6 |
| IV | 99.4 | 1.6 |
| V | 88.0 | 1.3 |
| VI | 89.5 | 5.8 |
| VII | 89.4 | 4.7 |
| VIII | 38.2 | 1.4 |
| IX | 90.0 | 2.0 |
| X | 60.9 | 1.6 |
| XI | 92.0 | 12.0 |
| XII | 85.1 | 1.6 | c. Even numbered samples are Urschellized; odd numbers not.

Examination of Examples I through XII indicate that the extraction ratio has been maintained at 1 to 10 (solid; liquid) and the wash ratio at 1:5 (extracted solids; liquid). Investigations have shown that satisfactory yields of protein, i.e., satisfactory protein concentration, can be obtained over the wide range of 1:3 to 1:27 (solids: extraction water) and 1:2 to 1:14 (extracted solids: wash water). Obviously to one skilled in the art these ratios may be varied over an even wider range. The major limitation in all cases being machine capability, i.e., capacity of equipment to handle the varied viscosities mentioned resulting from high solids content soybean suspensions and the uneconomical and inefficient handling and drying of very dilute solutions. Thus, the extraction and washing conditions described are intended to illustrate the process without imposing limitations in any way. Final suspension, i.e., 2 liters for odd numbered samples and 10 pounds for even numbered samples are governed solely by machine capabilities.

By referring to the above examples it becomes clear that in the production of soluble concentrates in particular, and protein products in general, several steps may be utilized:

1. An acidification step, to allow insolubilization of the major portion of protein without effecting the solubility of nonprotein constituents such as carbohydrates and ash.
2. A neutralization step. This increases the pH of the protein suspension to enhance the protein solubility, product functionality, or both. The neutralization step may also serve to furnish a product whose pH matches the pH of its intended usage area.
3. A heating step may also be incorporated to achieve perhaps several purposes. It may be used to pasteurize, to increase in some fashion the protein's functionality, to decrease the protein's taste or even in some instances to render the protein insoluble.

It is also apparent that within this general knowledge of protein structure and properties, each of the steps above may be subject to great internal variation. For example, acidification and neutralization pH's may be varied across the entire pH range constrained only by the dictates of practical considerations and the unique requirements of individual proteins. Temperature might be a point of wide variation, not only in the sense of temperature alone but also as a combination of temperature and time.

As indicated, prior art abounds with examples of processes for the production of proteinaceous materials using a combination of some or all of the above procedures. For example, U. S. Pat. No. 2,881,076 to Sair mentioned above teaches the use of acidification, neutralization, heating, and combinations thereof. Products prepared with these teachings are described in the odd numbered examples above and in several examples that follow.

For comparison these various steps taught in the Sair patent and well known in the art were combined with the novel feature of Urschellizing (a "coined" expression used hereafter to mean the passage of the subject suspension through the Urschel microhead mill to achieve cell disrupture) as described in the even numbered examples above and in several examples that follow.

One important characteristic of protein products is their capacity to bind water. A technique now being used to measure this property is to determine the change in viscosity upon heating and cooling. This is done with a Brabender Visco-Amylograph which records the force needed to turn a stirring shaft in a protein suspension as that suspension is brought from room temperature to 71°C. and back. Table One above compares the Brabender viscosity for these Urschellized and non-Urschellized products.

As can be easily seen from Table One, the absolute magnitude of the viscosity curve is appreciably different for Urschellized (even numbers) than non-Urschellized products. Furthermore, when, for example, the final column rise in considered, it can be seen that the steps employed during the production of the concentrate do not significantly affect viscosity performance when the cellular disruption process is absent. However, not only does the Urschellization process provide significantly improved performance with respect to viscosity, but also it allows a selection of end product viscosities heretofore unobtainable with existing technology. This is evidenced by the fact that Examples II and VI, VIII and X, and IV and XII are similar to the other member of the pair and fall into groups each different from the other.

Another technique which has been used to measure variability in various soy products is the emulsion stability test. In this procedure an emulsion of soy protein and soybean oil is formed, the emulsion is allowed to stand for 20 hours at 40°F., heated to 160°F. for 5 minutes, then centrifuged. The emulsion height remaining as a percentage of the original height has been recorded both before and after centrifugation.

This method may predict to some extent the performance of soy products in systems such as frankfurter emulsions which require fat binding and are heated during the processing to 160°F. Table Two compares the emulsion stability of these various examples. As can be seen in the "heating" column, the Urschellized instant process material falls into at least three separate classes exemplified by Examples II and IV, VI and XII, with Examples VIII and X forming emulsions of lower stability. Using this same criteria it is apparent that non-Urschellized products do not exhibit the same wide range of behavior.

EXAMPLE XIII (INVENTION)

To 4 gallons of cold water was added 7 lbs. of undenatured, defatted soy flakes. The slurry was adjusted to pH 5.1 with hydrochloric acid. The acidified slurry was passed through an Urschel Comitrol utilizing a microhead. This was centrifuged at 10,400 rpm for 15 minutes. The solids was washed with 3 gallons of tap water and recentrifuged at 5,000 rpm for 15 minutes. The resuspended solids was heated to 40°C. and the pH adjusted to 7.5 with sodium hydroxide. The adjusted mixture was heated to 80°C. and held for 10 minutes. This was then rapidly cooled and the mixture spray dried.

A mixture of 80 grams of spray dried powder was mixed completely with 450 ml. of water. The viscosity of this mixture was determined on a Brabender Viso-Amylograph with the following heating schedule. It was equilibrated for 10 minutes at 50°C. The temperature was then increased by graded instrumentation to 71°C. at 1.5° increase per minute. This was held at 71° for 6 minutes and then decreased to a temperature of 26°C. at 1.5°C. per minute increments. The results of this test are shown in the table below.

EXAMPLE XIV (PRIOR ART)

To 10.6 liters of cold water was added 1 kilogram of defatted soy flour to form a slurry. This was adjusted to pH 4.2 with 60 grams of concentrated HCl. This was stirred for 1 hour. The mixture was allowed to settle for 6 hours and the clear supernatant decanted. To the precipitate was added an equal volume of water, then stirred for 45 minutes. This was again allowed to settle and decanted and rewashed again with an equal volume of water. This same procedure was followed a second time to wash and resuspend the solids two times. The suspended solids were then spray dried. The dry sample gave the viscosity as shown, for example, by following the technique as described in Example XIII.

EXAMPLE XV (PRIOR ART)

The procedure was followed as in Example XIV to second washing step. The temperature of the suspension was raised to 110°-120°F. and 10 normal sodium hydroxide was added to adjust the pH to 6.7 with constant stirring. This neutralized solution was heated to 140°F. until a translucent viscous fluid was formed. This was then spray dried. The viscosity was run per Example XIII and the results are set forth below.

EXAMPLE XVI (INVENTION)

1 kilogram of defatted, undenatured soy flakes was added to 6 liters tap water. The pH of the solution was adjusted to 4.1 with 6 normal hydrochloric acid. This was then passed through an Urschel microhead two times so that all particles had passed through the slit opening of 0.006 inch. This processed material was centrifuged at 5,000 times gravity for 15 minutes. The residue was resuspended with 6 liters of tap water and recentrifuged. The solids were dispersed with an equal volume of water and heated to 45° to 49°C. The solution was neutralized to pH 6.6 with 10 normal sodium hydroxide NaOH and then heated to 60°C. and held for 30 minutes. This heated suspension was spray dried. The dried material was reconstituted for viscosity measurements—the data is given in the chart. It should be noted the tremendous increase in viscosity in this sample technique.

EXAMPLE XVII (INVENTION)

This example shows the effect of passing a mixture of 1 kilogram of defatted soy flakes and 6 liters of tap water through an Urschel head prior to adjusting the pH to 4.1 with hydrochloric acid. The process after acidification is the same as in Example XVI. The results show a significant decrease in viscosity compared to Example XVI.

EXAMPLE XVIII (PRIOR ART)

A conventional method for extracting soy flour in preparation of a soy protein concentrate was prepared by mixing 960 grams of defatted soy flour with 6 liters of cold tap water. The pH was adjusted to 4.5 with hydrochloric acid, stirred for 30 minutes, and centrifuged at 3,000 times gravity for 10 minutes. This was resuspended, washed, and recentrifuged. The solids were suspended in water, neutralized to pH 6.5 and spray dried. Viscosity data are given on the chart for these reconstituted solids.

EXAMPLE XIX (PRIOR ART)

The procedure is the same as in Example XVIII except that the neutralized solids were heated to 60°C. for 30 minutes prior to spray drying. It should be noted that heating of these solids after neutralization does affect the viscosity properties of the proteins but conventional methods of extraction do not give the tremendous increase in viscosity properties as noted by the instant invention.

BRABENDER AMYLOGRAPH COMPARISONS OF SOLUBLE SOY

| | In Brabender Units | | Concentrate Amount of Rise |
|---|---|---|---|
| | Final Peak Height | Low Point | |
| Example XIII | 1630 | 750 | 880 |
| Example XIV | 150 | 55 | 95 |
| Example XV | 180 | 30 | 150 |
| Example XVI | 2430 | 1540 | 890 |
| Example XVII | 1140 | 490 | 650 |
| Example XVIII | 200 | 100 | 100 |
| Example XIX | 450 | 110 | 340 |

In the above chart, Examples XIII, XVI and XVII show the viscosity effects of the instant process.

Examples XIV and XVIII show conventional methods of preparation and Examples XV and XIX, respectively, show similar sample preparations heated prior to spray drying and viscosity analysis.

Example XVI demonstrates the conditions when the pH of the solution is adjusted prior to subjecting it to the instant process and Example XVII shows the effect of the pH adjustment after the instant process.

While the Urschellization and acidification step are the most important in carrying out the invention, it should be pointed out that a neutralization step and/or a heating step may be carried out to provide several advantages. In the neutralization step, the pH of the protein suspension is raised which enhances the protein solubility, product functionality, etc. The neutralization step may be used to furnish the product with a pH that matches the pH of its intended usage area. Generally meat has a pH of about 5.7 to about 6.3 and by elevating the pH of the protein solids there is formed a protein fraction which is substantially all soluble or dispersible in a meat composition.

A heating step may also be incorporated to achieve several purposes. It may be used to pasteurize, to increase in some fashion the protein's functionality, to decrease the protein's taste or even in some instances to render the protein insoluble.

In summary, the solids precipitated from the comminutor are generally washed and recentrifuged to remove the soluble carbohydrate portion. The suspended solids can be dried and neutralized and liquefied and then spray dried. As a matter of fact, the solids as a wet mass without being dried can be used in ground meat formulations by adjusting the meat formulations to take into consideration the water bound up with the precipitated protein. The protein being precipitated in the range of 4.2 to 4.8, i.e. its isoelectric point, can be modified and its efficiency as an emulsifier and water binding agent also improved by further processing. Such further processing comprises raising the pH to result in a mass with a value in the range of from about 6 to 8.5 by adding a food grade alkaline material such as sodium hydroxide, sodium bicarbonate, or various phosphates such as sodium tripolyphosphate.

The emulsifying properties may be improved by heating the aqueous mass at a pH in the range of about 6.5 to about 8.0 for about 10 minutes or more at a temperature in the range of about 90° F. to 180° F. as to render the protein more colloidal in addition to modifying its viscosity properties. After such a heat treatment the suspension of solids may be dried to form a powder.

Obviously many modifications and variations of the invention as hereinbefore set forth may be made without departing from the spirit and scope thereof, and, therefore, only such limitations should be imposed as are indicated in the appended claims.

We claim:
1. A process for recovering vegetable protein concentrates, which process comprises: adjusting the pH of an aqueous mixture of defatted, vegetable protein source material to between about 3 to 5.5, and thereafter subjecting said aqueous mixture to high centrifugal speeds while passing it through a narrow shearing orifice whereby high intensity shearing forces disrupt the natural cell structure of the protein bodies, and thereafter recovering the vegetable protein concentrate solids.

2. The process of claim 1 wherein the pH is adjusted to between about 4 and about 5.

3. The process of claim 1 wherein the protein source material is derived from defatted soybeans.

4. The process of claim 3 wherein the protein source material is selected from the group consisting of soybean flakes, soybean grits and soybean flour.

5. The process of claim 4 wherein the aqueous mixture contains about 3–27 parts of water by weight for every part of protein source material.

6. The process of claim 5 wherein the shearing orifice is between about 0.0005 and about 0.012 inches.

7. The process of claim 6 wherein the aqueous mixture contains about 8 to 10 parts of water by weight for every part of vegetable protein source material.

8. The process of claim 7 wherein the pH of the aqueous mixture is adjusted to between about 4 and about 5.

9. The process of claim 8 wherein the mixture developes tangential speeds in excess of 2500 inches per second, and the protein cells are hydrated at or near their maximum.

10. The process of claim 1 wherein the protein concentrate is neutralized and heated to between about 40°C. and about 80°C. for at least about 10 minutes.

* * * * *